United States Patent
Mondello et al.

(10) Patent No.: US 11,373,527 B2
(45) Date of Patent: Jun. 28, 2022

(54) DRIVER ASSISTANCE FOR NON-AUTONOMOUS VEHICLE IN AN AUTONOMOUS ENVIRONMENT

(71) Applicant: Micron Technology, Inc., Boise, ID (US)

(72) Inventors: Antonino Mondello, Messina (IT); Alberto Troia, Munich (DE)

(73) Assignee: Micron Technology, Inc., Boise, ID (US)

( * ) Notice: Subject to any disclaimer, the term of this patent is extended or adjusted under 35 U.S.C. 154(b) by 127 days.

(21) Appl. No.: 16/363,033

(22) Filed: Mar. 25, 2019

(65) Prior Publication Data
US 2020/0312141 A1    Oct. 1, 2020

(51) Int. Cl.
*G08G 1/0967* (2006.01)
*B60W 50/14* (2020.01)
*H04W 4/44* (2018.01)

(52) U.S. Cl.
CPC ....... *G08G 1/096783* (2013.01); *B60W 50/14* (2013.01); *H04W 4/44* (2018.02); *B60W 2050/146* (2013.01)

(58) Field of Classification Search
CPC ....... G08G 1/096766; G08G 1/096775; G08G 1/096783; G01C 21/365; G01C 21/3673; G01C 21/3697; B60W 50/14; B60W 2050/146; H04W 4/44; G02B 2027/011; G02B 2027/0183; B60K 2370/334; B60K 2370/1529; B60R 2300/205; B60R 2300/306; B60R 2300/307; B60R 2300/308
See application file for complete search history.

(56) References Cited

U.S. PATENT DOCUMENTS

| 5,635,923 A * | 6/1997 | Steele ............... G07C 9/00182 340/5.64 |
| 6,246,948 B1 * | 6/2001 | Thakker .......... G08G 1/096725 123/351 |
| 6,442,473 B1 * | 8/2002 | Berstis ............ G08G 1/096716 701/117 |

(Continued)

FOREIGN PATENT DOCUMENTS

| DE | 102005037288 A1 * | 2/2007 |
| JP | 2004171459 A * | 6/2004 |
| JP | 2007072783 A * | 3/2007 |

OTHER PUBLICATIONS

Visionect, "Sydney launches world's first e-paper traffic signs", Visionect blog, May 20, 2015, 6 pages (Year: 2015).*

(Continued)

*Primary Examiner* — David A Testardi
(74) *Attorney, Agent, or Firm* — Greenberg Traurig (57) ABSTRACT

Disclosed are techniques for providing driver assistance to a non-autonomous vehicle while operating in an autonomous vehicle environment. In one embodiment, a method is disclosed comprising establishing a secure connection with an object selected from a group consisting of a road and lane of a road; receiving, from the object, a packet, the packet describing a condition of the object; validating the packet; generating an augmented display using data within the packet; and displaying the augmented display in a vehicle.

14 Claims, 6 Drawing Sheets

(56) References Cited

U.S. PATENT DOCUMENTS

| | | | | |
|---|---|---|---|---|
| 2005/0134478 | A1* | 6/2005 | Mese | G08G 1/096716 340/901 |
| 2005/0154505 | A1* | 7/2005 | Nakamura | G01C 21/365 701/1 |
| 2007/0176792 | A1* | 8/2007 | Butzer | G08G 1/096783 340/931 |
| 2007/0194950 | A1* | 8/2007 | Boss | G08G 1/0962 340/905 |
| 2007/0222555 | A1 | 9/2007 | Tengler et al. | |
| 2009/0063030 | A1* | 3/2009 | Howarter | G08G 1/096783 701/117 |
| 2010/0253541 | A1* | 10/2010 | Seder | G08G 1/165 340/905 |
| 2010/0324775 | A1* | 12/2010 | Kermani | G07C 5/008 701/31.4 |
| 2011/0092194 | A1 | 4/2011 | Boss et al. | |
| 2011/0093178 | A1* | 4/2011 | Yamada | G08G 1/096716 701/70 |
| 2011/0187558 | A1* | 8/2011 | Serex | F02D 31/001 340/905 |
| 2011/0199230 | A1* | 8/2011 | Stahlin | G08G 1/096716 340/901 |
| 2011/0251790 | A1 | 10/2011 | Liotopoulos et al. | |
| 2012/0169513 | A1 | 7/2012 | Szczerba et al. | |
| 2013/0063281 | A1* | 3/2013 | Malaska | G08G 1/095 340/905 |
| 2013/0067220 | A1* | 3/2013 | Ando | H04L 67/12 713/156 |
| 2013/0156017 | A1* | 6/2013 | Hori | G08G 1/163 370/336 |
| 2015/0149059 | A1* | 5/2015 | Choi | B60W 30/143 701/96 |
| 2015/0175068 | A1* | 6/2015 | Szostak | B60K 35/00 340/435 |
| 2015/0199904 | A1* | 7/2015 | Lee | G08G 1/096725 701/117 |
| 2015/0291160 | A1 | 10/2015 | Kim et al. | |
| 2016/0036917 | A1* | 2/2016 | Koravadi | H04W 4/44 701/2 |
| 2016/0065367 | A1* | 3/2016 | Oshida | H04W 12/0609 370/329 |
| 2016/0313562 | A1* | 10/2016 | Saisho | G02B 27/0179 |
| 2017/0132923 | A1* | 5/2017 | Li | G08G 1/0112 |
| 2017/0178507 | A1* | 6/2017 | Yokochi | G08G 1/096716 |
| 2017/0371608 | A1* | 12/2017 | Wasserman | G06Q 30/0261 |
| 2018/0130349 | A1* | 5/2018 | Du | G08G 1/0112 |
| 2018/0158328 | A1* | 6/2018 | Benhammou | G08G 1/0125 |
| 2018/0217612 | A1* | 8/2018 | Vladimerou | G08G 1/096775 |
| 2018/0254001 | A1* | 9/2018 | Koren | G06Q 50/01 |
| 2018/0260638 | A1* | 9/2018 | Michalakis | G06F 16/2365 |
| 2019/0049724 | A1* | 2/2019 | Kimura | G06K 9/00671 |
| 2019/0108548 | A1* | 4/2019 | Gaither | G06Q 30/0261 |
| 2019/0259208 | A1* | 8/2019 | Yaqub | G06F 3/147 |
| 2019/0295508 | A1* | 9/2019 | Tsuji | G02B 27/646 |
| 2019/0359228 | A1* | 11/2019 | Banno | B60W 40/072 |
| 2019/0391401 | A1* | 12/2019 | Funabiki | G02B 27/0179 |
| 2019/0392740 | A1* | 12/2019 | Funabiki | G02B 27/0179 |
| 2020/0012103 | A1* | 1/2020 | Kasazumi | G03B 21/142 |
| 2020/0021431 | A1* | 1/2020 | Mondello | G08G 1/096783 |
| 2020/0090375 | A1* | 3/2020 | Mori | G06F 16/53 |
| 2020/0105231 | A1* | 4/2020 | Higashiyama | B60K 35/00 |
| 2020/0221057 | A1* | 7/2020 | Shimoda | B60K 35/00 |
| 2020/0258480 | A1* | 8/2020 | Bronder | G01C 21/365 |
| 2020/0320676 | A1* | 10/2020 | Hardy | G08G 1/09623 |
| 2021/0019867 | A1* | 1/2021 | Hayashi | G06F 3/011 |
| 2021/0109357 | A1* | 4/2021 | Matsui | G09G 5/38 |
| 2021/0224917 | A1* | 7/2021 | Gaudin | B60W 50/14 |

OTHER PUBLICATIONS

Lira, Everton et al., "An architecture for traffic sign management in smart cities", 2016 IEEE 30th International Conference on Advanced Information Networking and Applications, Mar. 23-25, 2016, Crans-Montana, Switzerland, pp. 580 to 587 (Year: 2016).*

Mattoon, Dennis, "Establishing unique identity and security for cost sensitive embedded products", Electronic Design, Mar. 23, 2018, 14 pages (Year: 2018).*

Wikipedia article, "Advanced driver-assistance systems", Old revision dated Mar. 25, 2015, 3 pages (Year: 2015).*

International Search Report and Written Opinion, PCT/US2020/021119, dated Jun. 23, 2020.

* cited by examiner

DRIVER ASSISTANCE FOR NON-AUTONOMOUS VEHICLE IN AN AUTONOMOUS ENVIRONMENT

COPYRIGHT NOTICE

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

BACKGROUND

The disclosed embodiments are directed toward autonomous vehicles and, specifically, to systems for allowing non-autonomous vehicles to navigate in an autonomous vehicle environment.

As more human-operated vehicles are replaced by autonomous vehicles, various features of roadways and other environments will necessarily change. Specifically, current roadways are designed for human operators. Signage and warnings are primarily visual (e.g., road signs, traffic lights, construction warnings, etc.). As fewer humans operate vehicles, these visual indicators will cease to serve a useful purpose and will thus be able to be removed.

However, removal of the above-mentioned indicators is not achievable until all vehicles on a roadway are autonomous vehicles. Such a scenario delays the removal of visual indicators or, possibly, prevents the removal of such indicators. For example, while autonomous vehicles are rapidly being adopted, the point of 100% autonomous vehicle adoption will take significantly longer. Further, there are still scenarios where some vehicles (e.g., emergency or repair vehicles) may still retain human operators. Thus, under current systems, visual indicators cannot be removed and may never be able to be removed.

Current systems have made significant efforts in improving the performance of autonomous vehicles. "Smart" roadways (also known as intelligent transportation systems) have been proposed or designed, allowing for constant communication with autonomous vehicles. However, these proposals or systems have no means to inform non-autonomous vehicles of road conditions or signage. Further, many of these systems (or, especially, proposals) fail to include adequate security measures to prevent man-in-the-middle attacks and other malicious acts that would endanger autonomous vehicles or passengers therein.

Thus, there exists a need in the art for augmenting non-autonomous vehicles with displays of non-visible environment indicators.

SUMMARY

Disclosed herein are methods, computer-readable media, and devices for providing driver assistance to a non-autonomous vehicle while operating in an autonomous vehicle environment.

As will be described herein, the disclosed embodiments describe systems where non-autonomous vehicles can be augmented with indicator data received from an environment. In some embodiments, a non-autonomous vehicle is equipped with an augmented reality (AR) or heads-up display that displays real-time indicators (e.g., traffic light, stop sign, construction notice, speed limit, weather, etc.) transmitted by a roadway or devices near to the roadway. In some embodiments, these signals can be combined with real-time data regarding the operation of the vehicle to provide an accurate visualization of what the vehicle is doing and what may be required in the future. In some embodiments, visual indicators are used in lieu of text indicators (e.g., a visualization of a work crew instead of the text "men working") to provide a clear indicator that can be used regardless of the synchronization of the driver's language to the local language. The disclosed embodiments utilize a secure identification and communications protocol (e.g., DICE-RIoT) to secure communications between a vehicle and the roadway/markers.

In one embodiment, a method is disclosed comprising establishing a secure connection with an object selected from a group consisting of a road and lane of a road; receiving, from the object, a packet, the packet describing a condition of the object; validating the packet; generating an augmented display using data within the packet; and displaying the augmented display in a vehicle.

In one embodiment, a non-transitory computer readable storage medium for tangibly storing computer program instructions capable of being executed by a computer processor is disclosed, the computer program instructions defining the steps of: establishing a secure connection with an object selected from a group consisting of a road and lane of a road; receiving, from the object, a packet, the packet describing a condition of the object; validating the packet; generating an augmented display using data within the packet; and displaying the augmented display in a vehicle.

In one embodiment, a device is disclosed comprising a processor; and a storage medium for tangibly storing thereon program logic for execution by the processor, the stored program logic comprising: logic, executed by the processor, for establishing a secure connection with an object selected from a group consisting of a road and lane of a road, logic, executed by the processor, for receiving, from the object, a packet, the packet describing a condition of the object, logic, executed by the processor, for validating the packet, logic, executed by the processor, for generating an augmented display using data within the packet, and logic, executed by the processor, for displaying the augmented display in a vehicle.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

Figure 1:
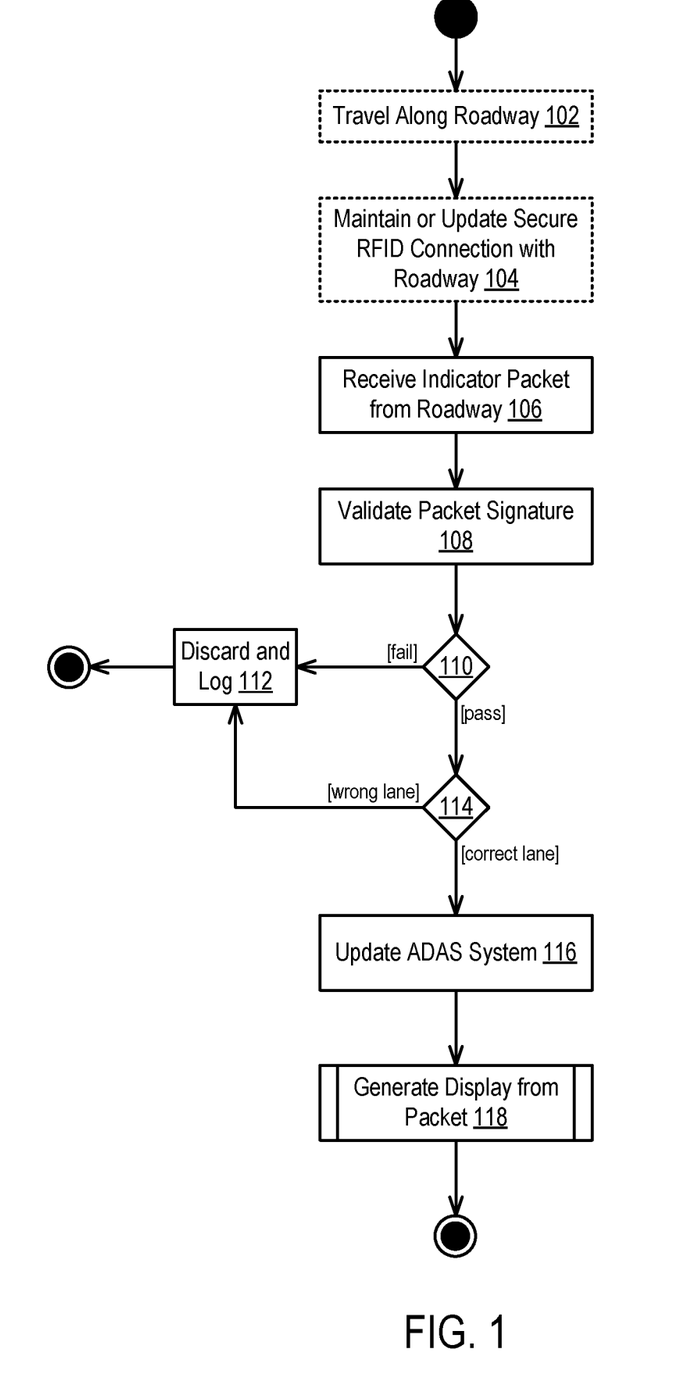
FIG. 1 is a flow diagram illustrating a method for receiving an indicator packet according to some embodiments of the disclosure.

FIG. 1 is a flow diagram illustrating a method for receiving an indicator packet according to some embodiments of the disclosure.

In step 102 and 104, a vehicle travels along a roadway and maintains/updates an RFID (or similar) connection with a roadway and/or with lanes of a roadway. Although RFID is used as an example, other protocols such as Wi-Fi, CDMA, W-CDMA, DSRC, or 5GLTE may be used in lieu of RFID.

In the illustrated embodiment, communications between a vehicle and a roadway (or lanes) are authenticated and secured using a DICE-RIoT protocol. The details of how to utilize a DICE-RIoT protocol are described in more detail in commonly assigned application Ser. No. 16/034,763 filed Jul. 13, 2018 and entitled "Secure Vehicular Communication" and the details of that application are incorporated herein by reference in their entirety.

In brief, a vehicle and a roadway/lane is equipped with a transmitter that includes a RIoT core processing module. This processing module is configured to generate a secure "triple" comprising a cryptographic identifier, a public key, and a security certificate. These values are generated based on a fused device secret (FDS) that is only available to an immutable bootloader (Level 0) on startup or restart. The FDS is used by the bootloader to generate a compound device identifier which is generated based on the FDS and a hash of "Level 1" code which can comprise The RIoT Core additionally creates an asymmetric DeviceID key pair using a deterministic key generation function seeded with the CDI. Additionally, the RIoT Core generates a cryptographic device identifier and a certificate. The device identifier, certificate, and public DeviceID key are exported to Layer 1 ($L_1$) software executing in, for example, the operating system (OS) of a vehicle or roadway transmitter. Additionally, the RIoT Core creates a certificate containing the DeviceID public key. The certificate allows other devices to confirm that the DeviceID public key is associated with the $L_0$ and $L_1$ layers of the RIoT Core. In one embodiment, RIoT Core signs the certificate using the DeviceID private key. In another embodiment, the RIoT Core creates a certificate signing request ("CSR") structure (e.g. a PKCS10 request) for the DeviceID public key, signed by the DeviceID private key.

The RIoT Core exports the DeviceID public key, certificate, and a vehicle identifier to the $L_1$ software. The $L_0$ and $L_1$ layers refer to software or firmware executing on a device (e.g., roadway) while $L_2$ refers to a layer on an external device (e.g., vehicle). This triple is generally represented as $\{ID_{Lk}$ public, $ID_{Lk}$ certificate, $K_{Lk}$ public$\}$. The $L_1$ software can comprise system-level or user-level code. No limitation is placed on the specific nature of the code. However, as will be described, one major functionality of the $L_1$ software is to securely transmit roadway or environment information.

Additionally, the $L_1$ on a given device can employ a double-encryption technique for generating the ID certificate portion of the triple exported to the $L_2$ code of another device. Specifically, the $L_1$ code first encrypts the $K_{L1public}$ key using the $ID_{L1public}$ key as the encryption key using a first encryption module, generating encrypted ciphertext K'. This ciphertext is then used as the data supplied to a second encryption module while the $K_{L1private}$ generated by a second generator is used as the encryption key. The result of the second encryption module is a doubly-encrypted ciphertext K" which is exported as the $ID_{L1}$ certificate. The specific choice of encryption algorithm (and corresponding decryption algorithm) is not limited in the disclosure.

Each device also includes certificate checking circuitry and/or software.

Each device is equipped with a certificate check (in hardware and/or software) which decrypts the $ID_{L1}$ certificate using the $K_{L1}$ public key via a first decryption module. The resulting key M' is then used as the key for a second decryption module which use the key M' to decrypt the $ID_{L1}$ public key. Finally, the resulting plaintext M" is compared to the original public key ($K_{L1public}$) via a comparator. If the result of the comparator is positive, the triple is confirmed as valid. If not, the triple is marked as invalid. The certificate checker can execute independently of the triple generation circuity/software. In this manner, triples of various entities can be verified by the $L_2$ code.

In the illustrated embodiment, the vehicle and roadway exchange and verify triples to ensure the integrity of the recipients. After this verification, the vehicle and roadway establish a secure connection (e.g., a TLS connection) to communicate securely. As illustrated, this connection may be handed off to other roadways as the vehicle travels.

In step 106, the method receives an indicator packet from the roadway.

In the illustrated embodiment, an indicator packet refers to data that is to be displayed to the operator of the vehicle. An indicator packet is, in general, associated with an indication. An indication comprises objects such as road signs, traffic lights, road conditions, construction notices, and generally any object or event visible on a roadway or otherwise representable by a sign or other visual indicator.

Each indication is associated with a location. For example, a traffic light indicator is associated with a point (or region) near an intersection. As described above, physical traffic lights may be removed from the intersection. Thus, the indicators are virtual representations of these, formerly, physical objects. In some embodiments, an indicator comprises a coordinate (or geofence) and a computer-processible description of the indicator. For example, a traffic light is associated with a point on a roadway and describes, for example, the timing of the traffic light. This type of indicator may be managed by a central (e.g., governmental) authority and may comprise fixed or semi-permanent indicators. As another example, a speed limit sign may comprise an indicator. In this context, the indicator may be persistent throughout a roadway and not limited to a specific point. Thus, the indicator may be transmitted repeatedly while a vehicle is traveling along a given road. As another example, an indicator may comprise a temporary indicator. For example, a construction crew may register a construction event taking place on a given segment of a roadway, the event having a fixed start and end time. In another embodiment, a physical transmitter may be plugged into the roadway allowing for ad hoc indicators to be installed within a roadway.

Figure 5:
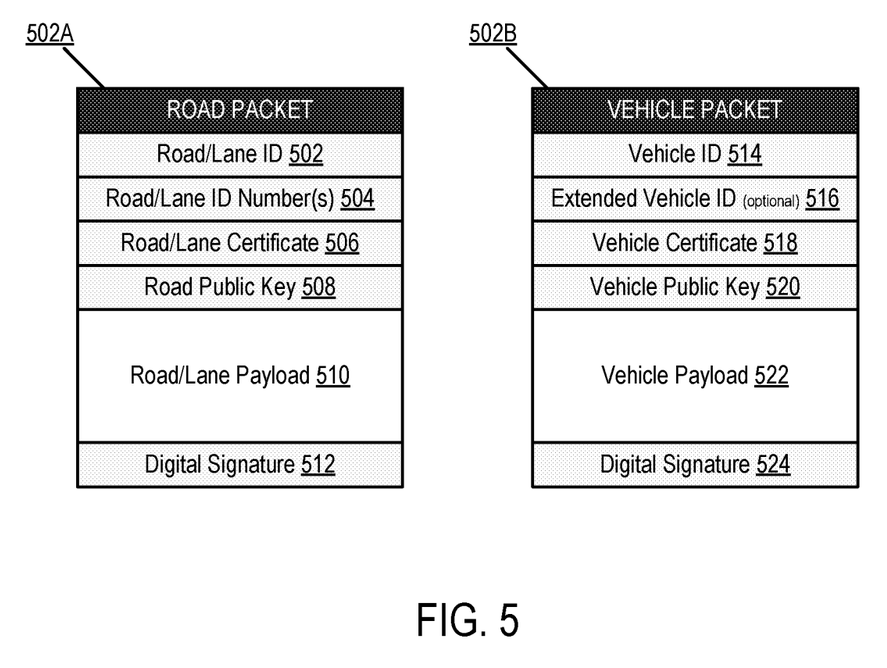
FIG. 5 is a packet structure diagram according to some embodiments of the disclosure.

Indicator data is packetized and transmitted from a roadway to a vehicle over the secure channel established between the two. FIG. 5 is a packet structure diagram according to some embodiments of the disclosure and the disclosure of that Figure is incorporated herein by reference.

In step 108, the method validates a packet signature.

As described in more detail in FIG. 5, each packet is signed by the sender using a private key. In step 108, the receiver (e.g., a vehicle) can verify the identity of the sender and authenticity using the senders public key which is included in the message itself. Thus, in step 108, the method ensures that the sender is indeed who they say they are.

In step 112, if the signature validation fails, the method discards the message and logs the failing message. In one embodiment, the logging of a message comprises proposing a new response block to a blockchain as described in FIG. 6.

In step 114, if the signature validation passes, the method determines if the message is directed toward the appropriate lane. In steps 102 and 104, the vehicle maintains an identifier of the current lane, coordinate with the roadway via the connection establishment process. The packet received in step 106 may comprise a packet issued by the roadway, broadcast to all vehicles, but identifying a specific lane. In step 114, the method ensures that the lane included in the packet matches the lane the vehicle is in at a given moment.

In step 116, if both validations pass, the method updates an advanced driver-assistance system (ADAS).

As known in the art, an ADAS is a system that can automate, adapt and enhance vehicle systems for safety and better driving. An ADAS includes electronic stability control, anti-lock brakes, lane departure warning, adaptive cruise control and traction control subsystems, alone or in combination, as well as any additional systems.

In the illustrated embodiment, the indicator data may be used to further refine the data used by these ADAS systems. For example, roadway signage indicators may be used to improve GPS navigation systems, driver reactions to speed warnings may be used to improve hill descent control systems, speed limit indicators may be used to refine speed limiting control systems, among other uses. The specification places no limit on the types of ADAS systems that may be used in conjunction with the indicator data and any such usages are contemplated by the specification.

In some embodiments, the packet received in step 106 can comprise a temporary indicator. For example, the packet may indicate that natural disaster or man-made accident is occurring (e.g., flood, earthquake, motor vehicle accident, etc.). This information may be relayed to the ADAS to update those systems appropriately.

Additionally, in some embodiments, the method may update a database of speed limits in the ADAS system or update traffic light statuses of traffic lights stored in the ADAS.

In step 118, the method generates a display using the packet data. This process is described in more detail in FIG. 2.

Figure 2:
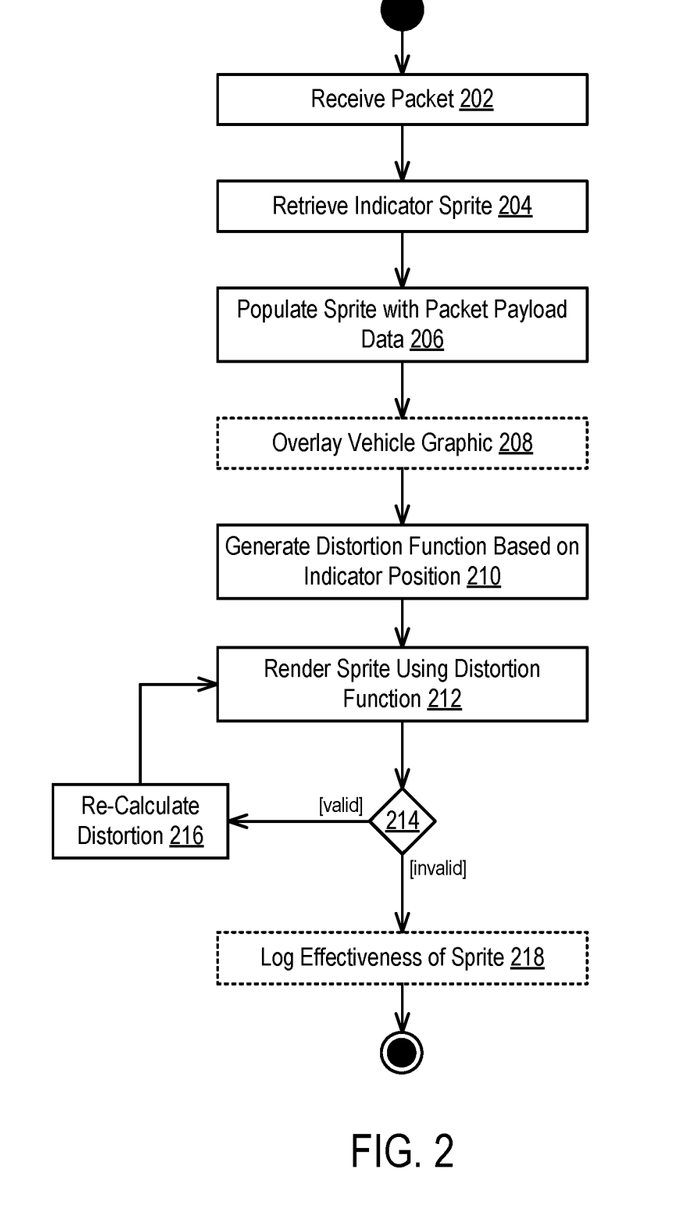
FIG. 2 is a flow diagram illustrating a method for generating a display from an indicator packet according to some embodiments of the disclosure.

FIG. 2 is a flow diagram illustrating a method for generating a display from an indicator packet according to some embodiments of the disclosure.

In step 202, the method receives a packet. In the illustrated embodiment, the packet comprises a packet received from a roadway or lane as described in FIG. 1. As illustrated in FIG. 5, the packet includes a payload that describes the indicator and can include data such as a location (e.g., coordinate), indicator type (e.g., speed limit sign), data regarding the indicator (e.g., the legal speed limit), and any other data relevant to the indicator. The aforementioned example of a speed limit sign is used herein.

In step 204, the method receives an indicator sprite and, in step 206, the method populates the sprite with packet payload data.

In one embodiment, a sprite comprises a graphical element (or elements) associated with a given indicator type. In some embodiments, these sprites are stored locally by the vehicle. In other embodiments, the vehicle may retrieve sprites from a remote, centralized location. In alternative embodiments, the sprite may be included within the payload.

In some embodiments, the sprite comprises both fixed elements, animated elements, and placeholder elements. Fixed elements comprise shapes that do not move relative to other shapes in the sprite. Animated elements include elements that move according to fixed paths with respect to the fixed elements. Placeholder elements comprise replaceable components of the sprites such as textual content, contextual graphics, etc. In some embodiments, the sprites may be location-specific and can be customized based on the jurisdiction of the vehicle.

Continuing the speed limit example, the sprite may include a fixed element comprising a U.S. speed limit sign (e.g., white rectangular shape) with the text "speed limit." The sprite may additionally include a placeholder for inserting the speed limit into the sprite. As another example, a construction sprite may include an animated portion of a crew working. In some embodiments, the fixed elements may additionally be internationalized to adapt to the operator of the vehicle. Thus, instead of stating "SPEED LIMIT" the aforementioned sprite may say "VELOCIDAD MAXIMA." Additionally, in some embodiments, the data inserted into placeholders may be translated based on jurisdiction. For example, a speed reported by a roadway may be in kilometers per hour while the sign in the U.S. may be converted to miles per hour, and (less likely), vice-a-versa.

Note that in some embodiments, the sprites include no textual elements and rely primarily on graphical or numerical elements. For example, a speed limit may be represented as the vehicles current speed and the maximum speed (e.g., "45/65 MPH"). Additionally, the speed limit sprite may change colors from green to orange to red as the user approaches 65. Further, the sprite may be equipped with an audible portion that plays an alarm when the user reaches the speed limit.

In step 208, the method optionally overlays a vehicle graphic over the sprite.

As indicated, Step 208 may be optional. For example, a vehicle overlay may not be displayed for a stop sign. As an additional example however, an indicator may comprise a dangerous curve indicator. In existing roadways, this sign comprises a generic n-shaped curve or similar shape. Alternatively, the sign simply recites "DANGEROUS CURVE AHEAD." In contrast to such a system, the indicator may comprise an identification of a dangerous curve type, but may also specify the speed and the path comprising the curve, unique to the dangerous curve. Using this data, the sprite associated with a dangerous curve may be more complex than graphical elements. For example, the sprite may comprise a dynamically generated rending of the curve itself using the path data and may be dynamically updated as the vehicle approaches the curve and when the user is within the curve.

In step 210, the method generates a distortion function based on the position of the indicator.

As described above, the display may comprise an augmented reality display or heads-up display. Thus, the generated display must be appropriate morphed to mimic its position in real-world space. In this manner, the method uses the geographic coordinates of the indicator (which are fixed or well known) and the geographic position of the vehicle to generate a distortion function for the sprite. Thus, distortion function skews or warps the perspective of the sprite while being displayed.

Since the vehicle is often in constant motion, the method generates a function that distorts the sprite based on the instant vehicle location as well as the positioning of the display within the operator's field of view. In this manner, the method generates a function having an input as the current position, velocity, and acceleration and manipulates the outline of the sprite so that the sprite mimics a real-world object in the display. Thus, a stop light display will appear smaller and continuously grow larger as the user nears the position of the indicator.

In step 212, the method renders the sprite using the distortion function. As described above, the method may display the sprite on an augmented reality display positioned within a vehicle such as on the windshield of the vehicle. Alternatively, the method may display the sprite on augmented reality glasses worn by the user while driving, which would reduce the modifications to a vehicle.

In step 214, the method continuous determines whether the sprite is still valid. As used herein, a valid sprite refers to one that is still relevant to the vehicle and/or operator of the vehicle. For example, a speed limit sign may only be valid while the user is on a section of road associated with the indicator. In some embodiments, step 214 simply monitors to the presence of the indicator and if the indicators time-to-live (TTL) has expired.

In step 216, the method re-calculates the distortion of the sprite while the sprite is valid. This re-calculation uses the distortion function identified in step 212 and comprises re-evaluating the function with an update position and/or a predicted future position.

In step 218, the method logs the effective of a sprite upon determining that the sprite is no longer to-be-displayed.

In one embodiment, the logging in step 218 is performed locally first and may be exported to an external source. In one embodiment, the logging data is included within a response packet transmitted from the vehicle to the roadway and is, eventually, logged in a blockchain data structure. The effectiveness of a sprite generally refers to the performance data of a vehicle gathered during the life of the sprite. For example, for a speed limit sprite, the performance data would include the actual speeds or, to reduce bandwidth congestion, an indication of when, if ever, the user exceeded the speed limit. For a dangerous curve indicator, the effectiveness may also include the above speed data and may also include whether the user crossed into another lane or onto the shoulder of the road. In some embodiments, the effectiveness may include a manual identification of an ineffective sprite. For example, an incorrect indicator may be flagged by the operator (e.g., incorrect identification of a construction zone).

It should be noted that the above method is described with respect to a single indicator. However, the method may be operated in parallel for any number of indicators present at a given moment. Thus, the method may display a speed limit sign, dangerous curve graphic, exit ramp sign, and various other sprites simultaneously. The method may employ various rules governing how to align such sprites when displayed simultaneously.

Figure 3:
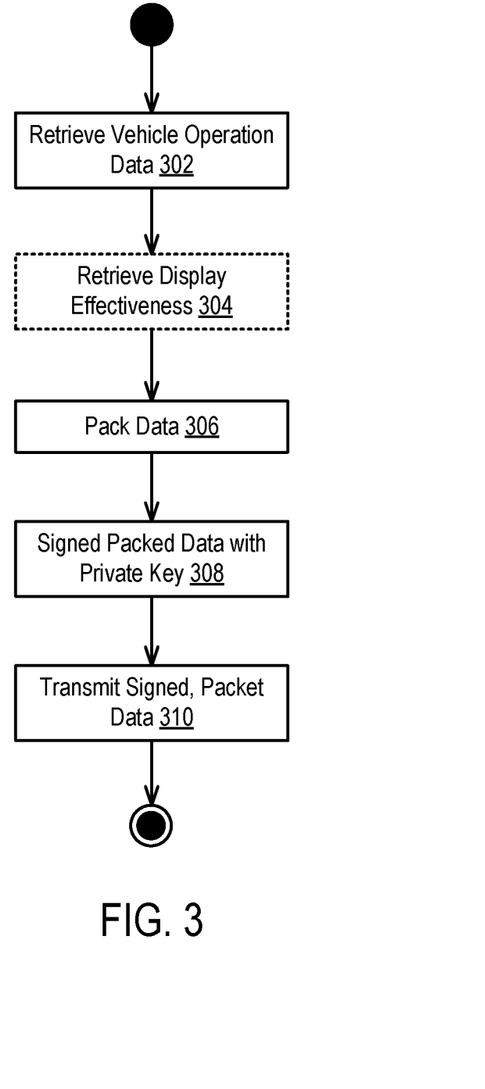
FIG. 3 is a flow diagram illustrating a method for responding to an indicator packet according to some embodiments of the disclosure.

FIG. 3 is a flow diagram illustrating a method for responding to an indicator packet according to some embodiments of the disclosure.

In step 302, the method retrieves vehicle operation data.

In the illustrated embodiment, the vehicle operation data comprises data regarding how the vehicle performed during the display of an indicator. This data includes data such speed, direction, acceleration, position, etc. of the vehicle during the indicator.

In step 304, the method optionally receives the display effectiveness generated in step 218 of FIG. 2.

In step 306, the method packs the operation data and, if available, the effectiveness data into one or more packets. As described in FIG. 5, these packets include a payload portion for storing such data.

In step 308, the method signs the packed data using a private key. This operation is described in more detail in FIG. 1 and is not repeated herein for the sake of clarity.

In step 310, the method transmits the signed packet data to the roadway via the secure channel discussed in FIG. 1.

The aforementioned method in FIG. 3 may be performed parodically during the display of an indicator sprite. Alternatively, or in conjunction with the foregoing, the methods in FIG. 3 may be performed in bulk after the indicator is invalid or expires as described in FIG. 2.

In some embodiments, steps 302 and 304 may be omitted. In this embodiment, the method may instead generate a request for information from the roadway. In this manner, the vehicle itself may proactively request indicator data from the roadway. Such a query could be broadly formatted as requesting all applicable indicators for a given section of a roadway. Alternatively, it could be narrowly defined as requesting what the speed limit is on a given section of roadway.

Figure 4:
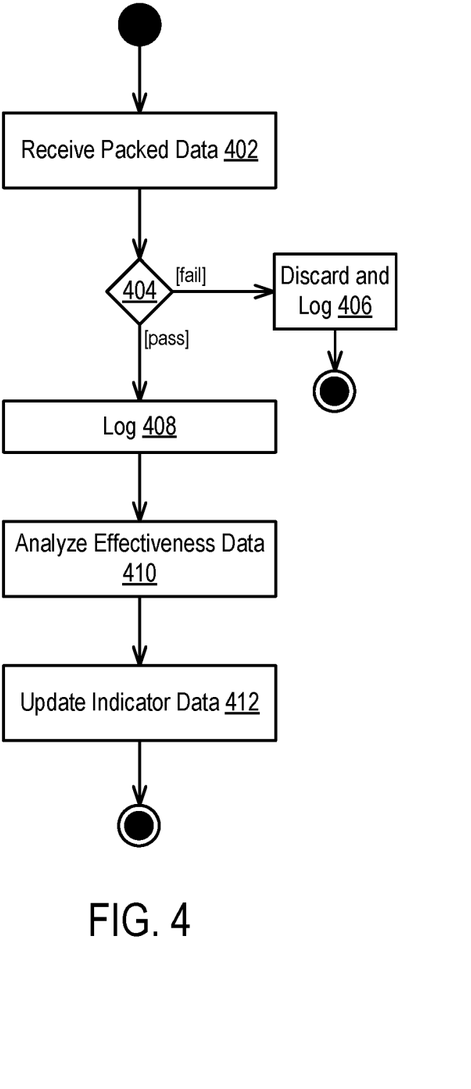
FIG. 4 is a flow diagram illustrating a method for processing vehicle data generated in response to an augmented display.

FIG. 4 is a flow diagram illustrating a method for processing vehicle data generated in response to an augmented display.

In step 402, the method receives packed data. In the illustrated embodiment, the methods described in FIG. 4 may be executed by a roadway or lane. In this embodiment, the packed data comprises the data generated in the methods of FIG. 3.

In step 404, the method determines if signature of the packed data is valid. Details of checking signatures of packets are described elsewhere and are not repeated herein but are incorporated by reference in their entirety.

In step 406, if the signature validation fails, the method discards the message and logs the failing message. In one embodiment, the logging of a message comprises proposing a new response block to a blockchain as described in FIG. 6.

In step 408, the method logs the received data if the signature validation is successful. In one embodiment, the logging of a message comprises proposing a new response block to a blockchain as described in FIG. 6.

In step 410, the method analyzes the effectiveness of the data.

As described above, the data returned by the vehicle may include operational data of the vehicle during the display of an indicator. For example, the user's speed during the display of a speed limit indicator. In step 410, the method compares the actual data to the expected data. For example, comparing the speed limit to the user's actual speed. If the data indicates that the user has not heeded the indicator, it represents that the indicator was potentially ineffective (e.g., was not positioned prominently). Alternatively, if the user obeys the indicator, it is evidence of an effective indicator.

In some embodiments, the above analysis may be undertaken on a per-user basis. That is, a user's reactions to all speed limit signs may be aggregated to determine whether a specific indicator is effective with respect to a specific operator. Alternatively, or in conjunction with the foregoing, the effectiveness data may be aggregated across multiple users to address the effectiveness of the indicator itself.

In step 412, the method updates the indicator data based on the effectiveness.

As described above, the method can flag those indicators that are ineffective either for a specific user or for all users.

The method may then modify the sprites associated with the indicator to enhance their effectiveness. For example, if a certain user routinely exceeds the speed limit, the method may automatically increase the size of the indicator. Alternatively, the method may forward the results to a human editor team which can replace the sprites with new sprites based on their own expertise.

FIG. 5 is a packet structure diagram according to some embodiments of the disclosure.

In the illustrated embodiment, two packets (502a, 502b) are illustrated. A first packet (502a) describes the data transmitted from a roadway to a vehicle while a second packet (502b) describes the data transmitted from a vehicle back to a roadway.

The packet (502a) includes identifying portion (502-508), payload (510), and signature (512). The identifying portion (502-508) includes a road or lane identifier (502). This identifier (502) comprises a cryptographically generated identifier of the road or lane. In one embodiment, the RIoT core generates this identifier (502) using an asymmetric key generator seeded with the CDI. The identifying portion (502-508) additionally includes a road or lane identification number (504). In contrast to identifier (502), this identifier (504) comprises a textual or numerical identifier of a roadway or lane (e.g., "US RTE 1," US RTE 1, segment 123," "US RTE 1, segment 123, lane 2"). Other encoding systems may be used to encode individual roadways or lanes. The identifying portion (502-508) additionally includes a certificate (506) and a public key (508). The certificate (506) and public key (508) are also generated by the RIoT core of the roadway. In one embodiment, the public key (508) is generated by an asymmetric key generator seeded with a random number. In one embodiment, the certificate is formed by encoding the public key using a private key of the output of the aforementioned asymmetric key generator seeded with the CDI. The output of this encryption is used as the data to be encrypted using the private key generated by the asymmetric key generator seeded with a random number. The packet (502a) also includes a payload portion (510). This payload comprises, for example, the indicator information described previously. Finally, the fields above (502-510) are signed by the sender using the senders private key (generated by the asymmetric key generator seeded with a random number) and the signature is included within the digital signature (512). In some embodiments, the packets may additionally include a freshness indicator (monotonic counter, timestamp, etc.) to avoid replay attacks.

The packet (502b) is similarly structured to packet (502a) and overlapping details will not be repeated herein. In general, the packet (502b) comprises an acknowledgment packet sent by a vehicle to a roadway. In some embodiments, the packet (502b) may comprise a status packet transmitted by the vehicle. The packet (502b) includes a cryptographic vehicle identifier (514), vehicle certificate (518) and vehicle public key (520) generated by the vehicle in the same manner as that described in connection with packet (502a). In the illustrated embodiment, the identifying portion (514-520) of packet (502b) includes an extended vehicle identifier (516) which, like the road/lane identifier number, comprises a human-readable identifier such as a vehicle identification number or similar serial number. The packet (502b) additionally includes a payload (522) which includes response data transmitted by the vehicle to roadway, as previously discussed. Finally, the fields above (514-522) are signed by the sender using the senders private key (generated by the asymmetric key generator seeded with a random number) and the signature is included within the digital signature (524). In some embodiments, the packets may additionally include a freshness indicator (monotonic counter, timestamp, etc.) to avoid replay attacks.

Figure 6:
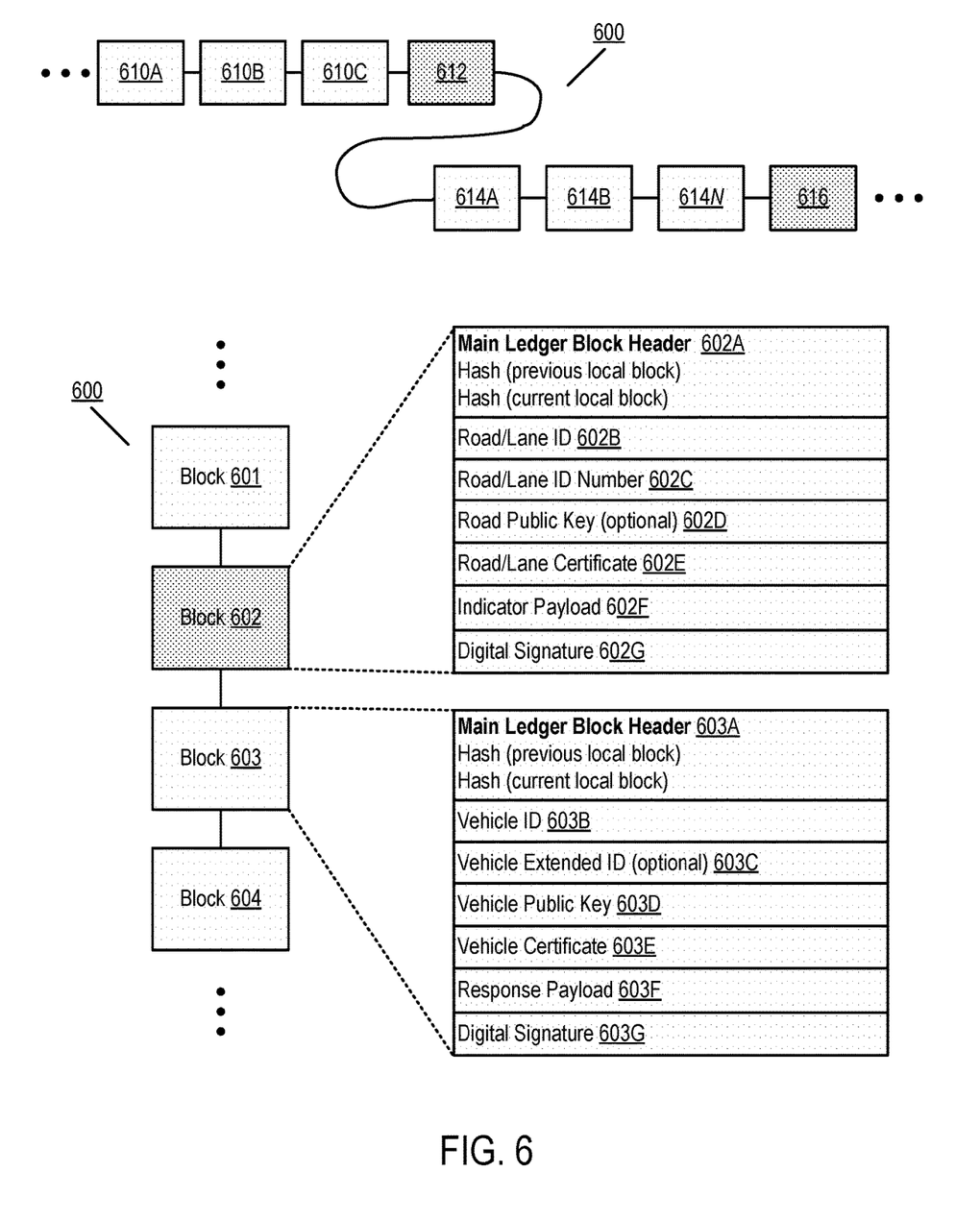
FIG. 6 is a diagram of a blockchain and respective blocks therein according to some embodiments of the disclosure.

FIG. 6 is a diagram of a blockchain and respective blocks therein according to some embodiments of the disclosure.

In the illustrated embodiment, a blockchain (600) includes a plurality of blocks such as blocks 610a-610c, 612, 614a-612n, and 616. In one embodiment, blocks 610a-610c and 614a-612n comprise blocks proposed by vehicles (described in more detail in connection with block 603). Interspersed with vehicle-proposed blocks (610a-610c and 614a-612n) are road/lane proposed blocks (612, 616). These blocks are generated (and signed) by roadway devices themselves. As illustrated, vehicle-proposed blocks (610a-610c and 614a-612n) may comprise response blocks to an initial road/lane block.

Blockchain (600) is alternatively illustrated with a plurality of blocks (601-604) wherein the block structure of two blocks (602, 603) is expanded. In one embodiment, blocks (602, 603) correspond to blocks (612, 614a).

In the illustrated embodiment, both blocks (602, 603) includes a main ledger block header (602a, 603a) that includes a hash of the current block and hash of the previous block. In the illustrated embodiment, the main ledger block header (602a, 603a) comprises a standard blockchain header for creating a linked list of transactions.

Each block includes a cryptographic sender identifier (602b, 603b), an extended identifier (602c, 603c), a sender public key (602d, 603d), and a sender certificate (602e, 603e). The details of these fields are described in FIG. 5 and are not repeated herein for the sake of clarity. As illustrated, in the block (602), the public key (602d) may be optional. Blocks (602a, 602b) also include data (602f, 603f) which corresponds to payloads (510, 522).

Finally, each block is signed by the sender and the signature is packed and included in the block as packed digital signature (602g, 603g). In the illustrated embodiment, the signature (602g, 603g) is signed using the senders private key and is verified by a receiver using the sender's public key.

In the illustrated embodiment, the method logs data to a blockchain data structure in multiple steps. In each step, as described above, logging data comprises adding a block to the blockchain data structure. In the illustrated embodiments, a block is recognized as part of the blocking (i.e., is included in the ledger) if two conditions are met. First, during insertion, the hash of the previous block must match the hash of the previous block as previously computed. That is, the "Hash (previous local block)" of header 603a must match "Hash (current local block)" of previous block 602a, before block 603 is inserted. In addition to this requirement, the block must satisfy a second, non-standard condition that the block be generated by an authorized host of the system. This particular requirement is, effectively, an alternative to proof-of-work in traditional blockchain systems (i.e., a mathematical competition among nodes). Specifically, in the illustrated blockchain, the nodes participating in the system attempt to guess the right signature to insert the block in the block chain. However, in the system, one entity in the system owns the private key used to generate the signature and thus can quickly "win" the competition (while the assertion is able to be validated by any other node using the private key owner's public key). In this manner, only the genuine signatory can win the competition, preventing unauthorized entry of blocks into the blockchain.

Figure 7:
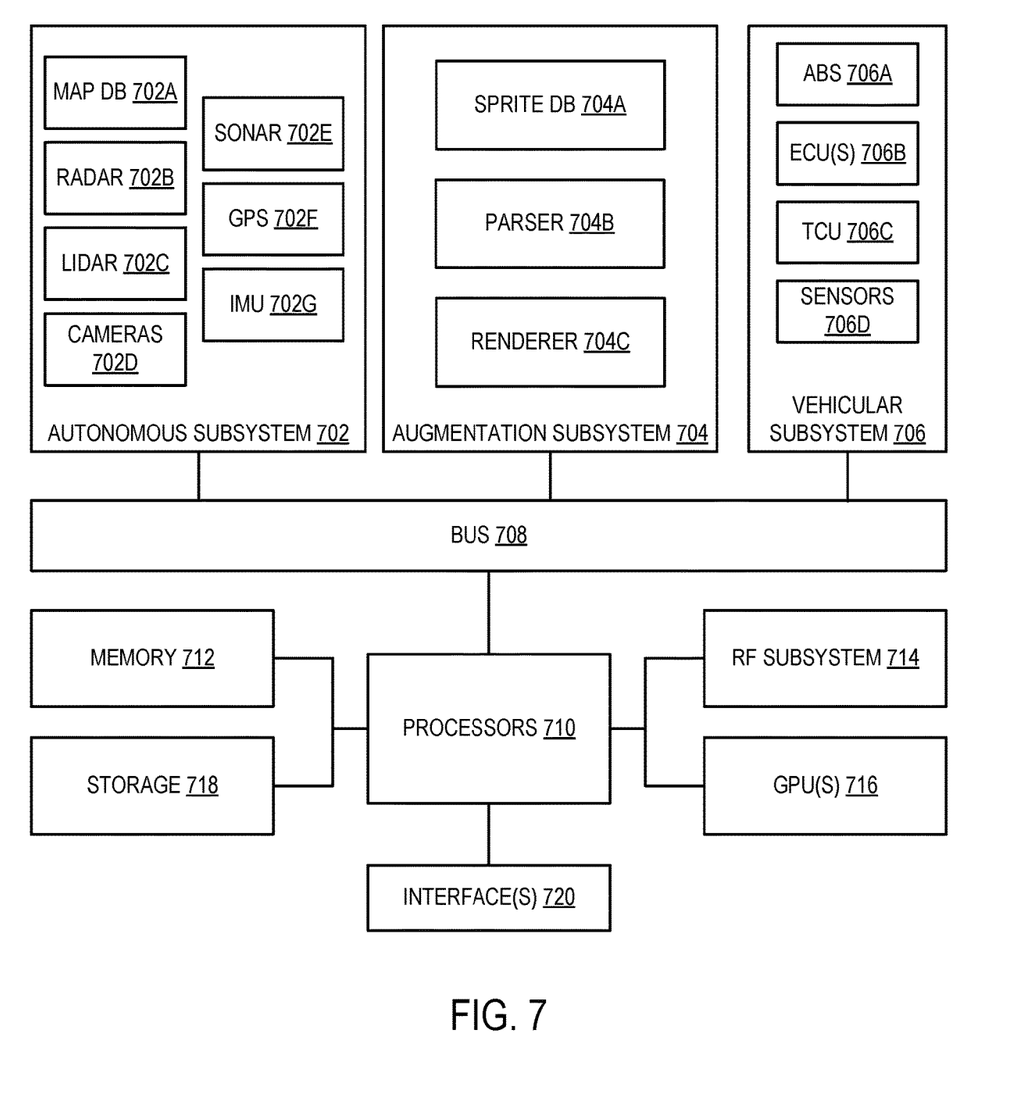
FIG. 7 is a block diagram of an autonomous vehicle according to some embodiments of the disclosure.

FIG. 7 is a block diagram of an autonomous vehicle according to some embodiments of the disclosure.

The system illustrated in FIG. 7 may be installed entirely within a vehicle. In some embodiments, some components (e.g., components and subsystems other than subsystem (704)) may comprise existing autonomous vehicle subsystems.

The system includes an autonomous vehicle subsystem (702). In the illustrated embodiment, autonomous vehicle subsystem (702) includes map database (702A), radar devices (702B), Lidar devices (702C), digital cameras (702D), sonar devices (702E), GPS receivers (702F), and inertial measurement units (702G). Each of the components of autonomous vehicle subsystem (702) comprise standard components provided in most current autonomous vehicles. In one embodiment, map database (702A) stores a plurality of high-definition three-dimensional maps used for routing and navigation. Radar devices (702B), Lidar devices (702C), digital cameras (702D), sonar devices (702E), GPS receivers (702F), and inertial measurement units (702G) may comprise various respective devices installed at various positions throughout the autonomous vehicle as known in the art. For example, these devices may be installed along the perimeter of an autonomous vehicle to provide location awareness, collision avoidance, and other standard autonomous vehicle functionality.

Vehicular subsystem (706) is additionally included within the system. Vehicular subsystem (706) includes various anti-lock braking systems (706A), engine control units (702B), and transmission control units (702C). These components may be utilized to control the operation of the autonomous vehicle in response to the streaming data generated by autonomous vehicle subsystem (702A). The standard autonomous vehicle interactions between autonomous vehicle subsystem (702) and vehicular subsystem (706) are generally known in the art and are not described in detail herein.

The processing side of the system includes one or more processors (710), short-term memory (712), an RF system (714), graphics processing units (GPUs) (716), long-term storage (718) and one or more interfaces (720).

The one or more processors (710) may comprise central processing units, FPGAs, or any range of processing devices needed to support the operations of the autonomous vehicle. Memory (712) comprises DRAM or other suitable volatile RAM for temporary storage of data required by processors (710). RF system (714) may comprise a cellular transceiver and/or satellite transceiver. Long-term storage (718) may comprise one or more high-capacity solid-state drives (SSDs). In general, long-term storage (718) may be utilized to store, for example, high-definition maps, routing data, and any other data requiring permanent or semi-permanent storage. GPUs (716) may comprise one more high throughput GPU devices for processing data received from autonomous vehicle subsystem (702A). Finally, interfaces (720) may comprise various display units positioned within the autonomous vehicle (e.g., an in-dash screen).

The system additionally includes an augmentation subsystem (704) which performs the operations required by the methods illustrated in the preceding Figures. The augmentation subsystem (704) includes a sprite database (704a) which stores (either permanently or as a cache for a cloud-based system) sprite data to be used to generate augmented reality or heads-up display data.

The augmentation subsystem (704) additionally includes a parser (704b). In one embodiment, parser (704b) is configured to receive messages from the roadway (e.g., using a DICE-RIoT protocol) and extract data needed by sprites stored in the database (704a). The parser (704b) is further configured to insert the data in to the sprites.

The augmentation subsystem (704) additionally includes a renderer (704c). In one embodiment, renderer (704c) is responsible for taking the completed sprite and generating a distortion function. Additionally, the renderer (704c) is responsible for monitoring the position of the vehicle and the validity of the sprite and refreshing the display of the sprite on a display (via interfaces 720).

Each of the devices is connected via a bus (708). In one embodiment, the bus (708) may comprise a controller area network (CAN) bus. In some embodiments, other bus types may be used (e.g., a FlexRay or MOST bus). Additionally, each subsystem may include one or more additional buses to handle internal subsystem communications (e.g., LIN buses for lower bandwidth communications).

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
   receiving, by a processor of a vehicle, a packet from a wireless communication device, the packet describing a condition of an object selected from a group consisting of a road and lane of a road;
   generating, by the processor, a distortion function based on a position associated with the object and a position of the vehicle, the distortion function receiving inputs of a current position, a velocity, and an acceleration of the vehicle;
   selecting, by the processor, a sprite associated with the packet and modifying the sprite based on data included in the packet and the distortion function;
   generating, by the processor, an augmented reality display using the sprite;
   displaying, by the processor, the augmented reality display in a vehicle;
   logging, by the processor, an effectiveness of the sprite, the effectiveness comprising a comparison between performance data recorded while the sprite was displayed and expected data; and
   modifying, by the processor, a property of the sprite when the effectiveness indicates that the sprite was ineffective.

2. The method of claim 1, wherein generating the augmented reality display further comprises overlaying an image of the vehicle in the augmented reality display.

3. The method of claim 1, further comprising transmitting, by the processor to the wireless communication device, data regarding operations of vehicle undertaken after displaying the augmented reality display.

4. The method of claim 1, wherein generating the augmented reality display comprises generating a heads-up display.

5. The method of claim 1, further comprising updating an advanced driver-assistance system (ADAS) using the packet.

6. A non-transitory computer readable storage medium for tangibly storing computer program instructions capable of being executed by a computer processor, the computer program instructions defining steps of:
- receiving, at a vehicle, a packet from a wireless communication device, the packet describing a condition of an object selected from a group consisting of a road and lane of a road;
- generating a distortion function based on a position associated with the packet and a position of the vehicle, the distortion function receiving inputs of a current position, a velocity, and an acceleration of the vehicle;
- selecting a sprite associated with the packet and modifying the sprite based on data included in the packet and the distortion function;
- generating an augmented reality display using the sprite;
- displaying the augmented reality display in a vehicle;
- logging an effectiveness of the sprite, the effectiveness comprising a comparison between performance data recorded while the sprite was displayed and expected data; and
- modifying a property of the sprite when the effectiveness indicates that the sprite was ineffective.

7. The non-transitory computer readable storage medium of claim 6, wherein generating the augmented reality display further comprises overlaying an image of the vehicle in the augmented reality display.

8. The non-transitory computer readable storage medium of claim 6, wherein the computer program instructions further define a step of transmitting, to the wireless communication device, data regarding operations of vehicle undertaken after displaying the augmented reality display.

9. The non-transitory computer readable storage medium of claim 6, wherein generating the augmented reality display comprises generating a heads-up display.

10. The non-transitory computer readable storage medium of claim 6, wherein the instructions further define a step of updating an advanced driver-assistance system (ADAS) using the packet.

11. A device comprising:
- a processor; and
- a storage medium for tangibly storing thereon program logic for execution by the processor, the stored program logic comprising:
  - logic, executed by the processor of a vehicle, for receiving a packet from a wireless communication device, the packet describing a condition of an object selected from a group consisting of a road and lane of a road,
  - logic, executed by the processor, for generating a distortion function based on a position associated with the packet and a position of the vehicle, the distortion function receiving inputs of a current position, a velocity, and an acceleration of the vehicle,
  - logic, executed by the processor, for selecting a sprite associated with the packet and modifying the sprite based on data included in the packet and the distortion function,
  - logic, executed by the processor, for generating an augmented reality display using the sprite,
  - logic, executed by the processor, for displaying the augmented reality display in a vehicle;
  - logic, executed by the processor, for logging an effectiveness of the sprite, the effectiveness comprising a comparison between performance data recorded while the sprite was displayed and expected data, and
  - logic, executed by the processor, for modifying a property of the sprite when the effectiveness indicates that the sprite was ineffective.

12. The device of claim 11, wherein the stored program logic further comprises logic, executed by the processor, for transmitting, to the wireless communication device, data regarding operations of vehicle undertaken after displaying the augmented reality display.

13. The device of claim 11, wherein the logic for generating an augmented reality display comprises logic, executed by the processor, for generating a heads-up display.

14. The device of claim 11, wherein the stored program logic further comprises logic, executed by the processor, for updating an advanced driver-assistance system (ADAS) using the packet.

* * * * *